(No Model.) 2 Sheets—Sheet 1.
C. C. PECK & W. H. CHAPMAN.
ELECTRIC MOTOR.
No. 309,562. Patented Dec. 23, 1884.
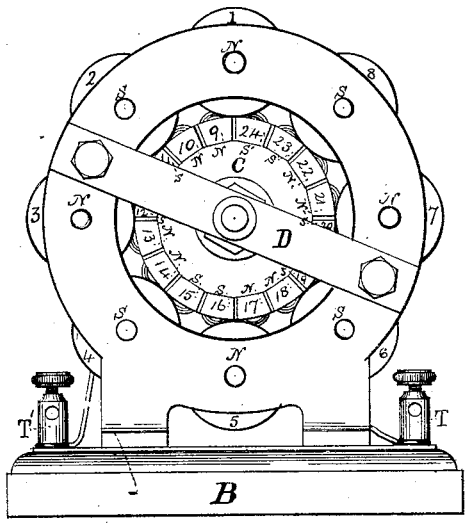
Fig 1
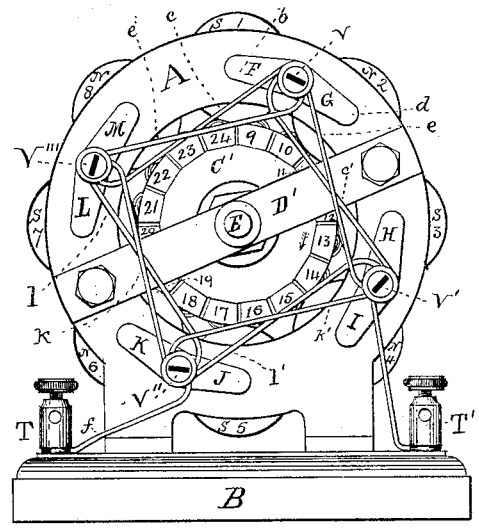
Fig 2
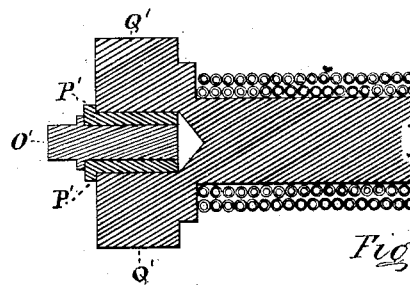
Fig 3
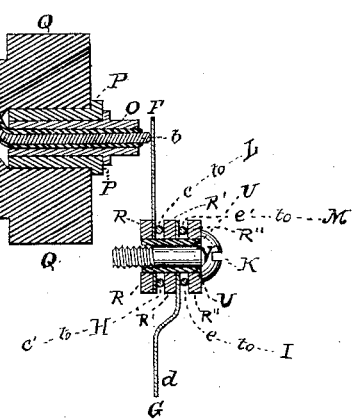
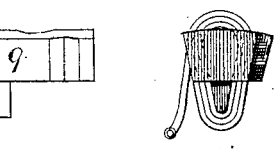
Fig 4
Fig 5
Witnesses
Edw H W Forder
Jas H Moore
Inventors
Chas C. Peck & Wm H Chapman
by McDaniel, Wheeler & Souther
Attorneys
N. PETERS, Photo-Lithographer, Washington, D. C.

(No Model.) 2 Sheets—Sheet 2.

C. C. PECK & W. H. CHAPMAN.
ELECTRIC MOTOR.

No. 309,562. Patented Dec. 23, 1884.

Witnesses
Edw<sup>d</sup> H H Forder
Jas Moore

Inventors
Chas C Peck & W<sup>m</sup> H Chapman
by McDaniel Wheeler & Souther
Attorneys

UNITED STATES PATENT OFFICE.

CHARLES C. PECK AND WILLIAM H. CHAPMAN, OF MIDDLEBURY, VERMONT, ASSIGNORS TO THE CHAPMAN ELECTRIC MOTOR COMPANY, OF NEW YORK.

ELECTRIC MOTOR.

SPECIFICATION forming part of Letters Patent No. 309,562, dated December 23, 1884.

Application filed December 1, 1883. (No model.)

*To all whom it may concern:*

Be it known that we, CHARLES C. PECK and WILLIAM H. CHAPMAN, citizens of the United States, residing at Middlebury, in the county of Addison and State of Vermont, have invented a new and useful Electric Motor, of which the following is a specification.

Our present invention relates to an improved method of applying the principle described and illustrated in the patent for electric magnetic motor issued to us December 19, 1882, and also in other subsequent patents, viz., bringing an armature in contact with a magnet by rolling one upon the other.

Our present improvement consists, chiefly, in the arrangement of two or more magnets or armatures in a circle, and of one or more armatures or magnets adapted to roll on the surfaces of the former, and so adjusted as to produce a continuous rotary motion of a shaft to which one group, either of the magnets or armatures, is attached.

The principal objects of this invention are, first, to utilize the whole attractive force of each magnet by causing it to be exerted until its armature comes in contact with it, thus diminishing the number of reversals of the current required to do a given amount of work, and thus also utilizing the force exerted by the magnet during the last portion of the armature's approach, which is proportionally much greater than that exerted in any other part of the magnetic field; second, in like manner and for similar reasons, to diminish the amount of magnetic material required to do a given amount of work. Small magnets are much more powerful in proportion to their weights than large ones, and it is advantageous, other things being equal and within certain limits, to increase the power of a machine by increasing the number of magnets used in it, rather than by increasing the size of each; third, so to arrange the machine that the magnets and armatures, by their mutual adjustment, shall constitute a commutator.

To accomplish these results we employ the mechanism described in this specification and shown in the accompanying drawings.

Figure 6:
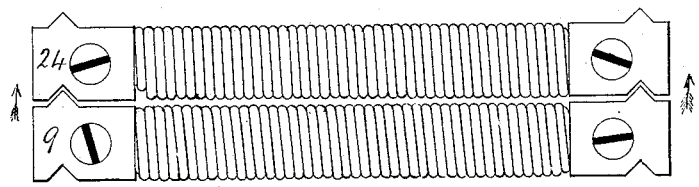
Figure 7:
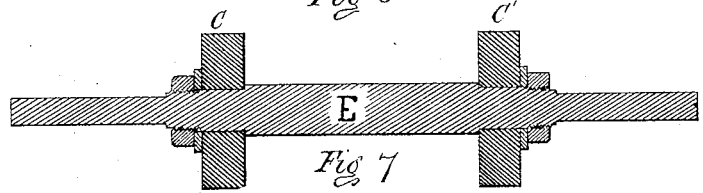
Figure 8:
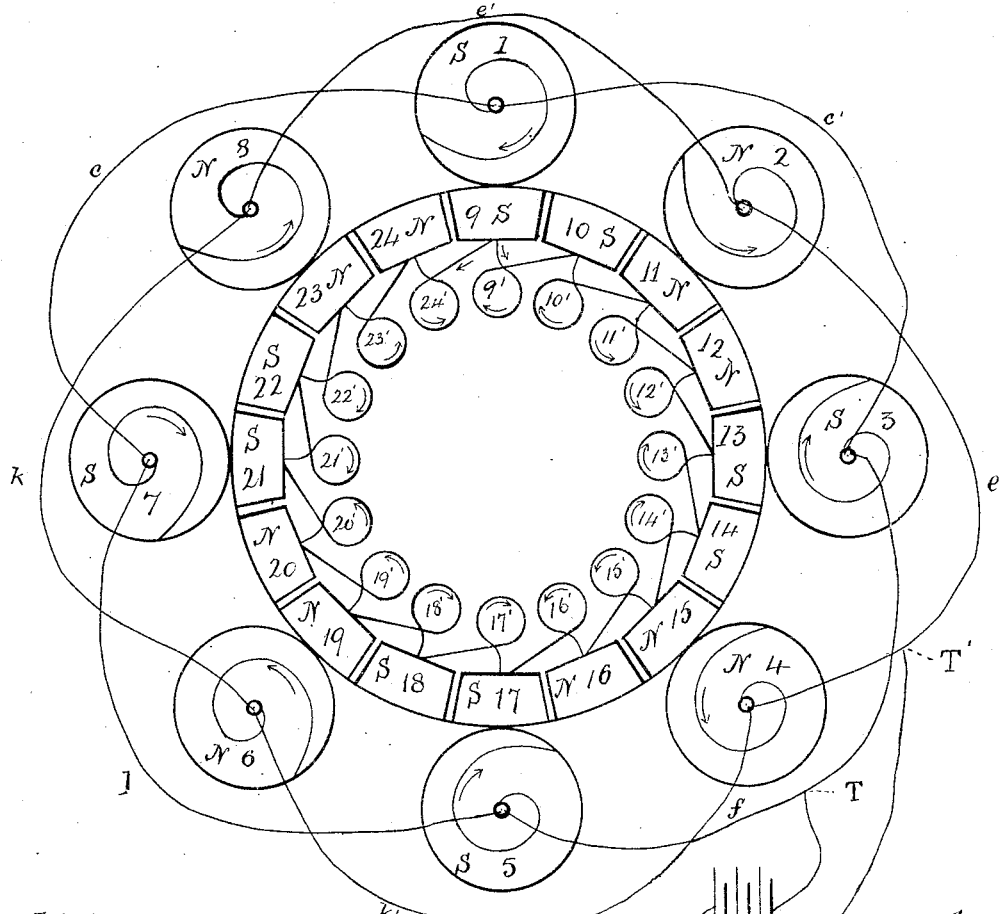

Figure 1 is an end view of one end of the machine. Fig. 2 is an end view of the other end of the machine and its connections. Fig. 3 is a longitudinal section of one of the rolling magnets with its contact-springs and binding-screw. It is marked 1, because the lettering of the connections is that of the connections of 1; but all the rolling magnets are alike in section. Fig. 4 is a side elevation of one of the armatures. It is marked 9, because the numbering of the connections is that of 9; but all the armatures are alike in section. Fig. 5 is an end view of the same. Fig. 6 is a plan view of two of the armatures as they appear looking from above upon the curvilinear surfaces which come in contact with the rolling magnets. The arrows show the direction in which the contact moves over the surface. Fig. 7 is a longitudinal cross-section of the shaft and drums C and C', to which the armatures are secured. On each end of this shaft there is room for a fly-wheel. Fig. 8 is a diagram showing the course of the electric current, and is lettered to correspond with the end shown in Fig. 2.

A is a cheek-piece or standard, mounted firmly upon a base, B.

1 2 3 4 5 6 7 8 are eight electro-magnets, spool-shaped, with cylindrical heads, the coils around which are wound in the same direction. Each revolves upon its own axis of rotation.

Whenever in this specification the word "electro-magnet" is used as applicable to any part of this apparatus, it refers to one of these cylindrical-headed magnets, which on the drawings are numbered from 1 to 8, unless otherwise indicated.

C and C' are wheels or drums, made of hard rubber or other insulating material, and set upon one axis. The axis of these wheels E is supported by the cross pieces or braces D and D', which are supported by the cheek pieces or standards A and A'. These braces may be dispensed with and the magnet-heads be made with flanges. In this method of construction the magnet-heads themselves serve for bearings for the drums C and C'. Around the periphery of each drum, and fastened firmly to it, are sixteen armatures, numbered, respectively, from 9 to 24, both inclusive, each of which is itself an electro-magnet, but is not, for the sake of clearness, generally so designated in this specification, and each of which is separated from those on either side of it by non-magnetic material. The coils around these are all wound in the same direction as each other and in the same direction as the coils of the magnets 1 to 8. The coils of these armatures are numbered from 9' to 24', both inclusive, in Fig. 8. The arrows show the direction in which the current travels in each coil, and the continuation of the line of each coil shows its connection with the two armature-heads with which it is connected. Thus, for example, when the connections and position of the machine are as shown in Fig. 8, the current enters at T, passes through the wire $f$ to the contact-spring J, thence through the coil of 5 to the magnet-head of 5 at the end through which the wire of the coil has entered. Thence it enters the armature-head of armature 17, and there divides, one branch passing through the coil 17' around armature 17, and thence through wires to the armature-head 18, to which it is attached, and the other branch passing through the wire $h$, leading to the coil 16' around armature-head 16. In like manner all the armature-heads are connected, as indicated in Fig. 8. These armatures are so adjusted and attached to the drum that the exterior curvilinear surfaces of their heads revolve with the drum and in successive contact with the cylindrical heads of the magnets 1 to 8, both inclusive. Each of these curvilinear exterior surfaces forms an arc of the same circle, as shown in Figs. 1, 2, and 8. The shape of the heads of the armatures is shown in Figs. 4, 5, and 6. A V-shaped projection at the side of each fits into a V-shaped depression in the side of that next to it. The object of this is twofold: first, to maintain an unbroken periphery for the magnet to roll upon; second, to allow the magnets to come suddenly into contact with a considerable portion of the armature-head, and thus reverse the current in the coil on said armature when the contact of the magnet with it is fully established, and not before. To accomplish this latter object with the construction shown in the drawings, the movement of the line of contact of the rolling magnets must be always from the points of the V-shaped projections; but if the machine is used as a generator of electricity, the motion of the magnets should properly be toward the points, instead of from them. This form of armature-head is preferable, but not essential. The magnets should be electrically connected in two groups, the members of each group in multiple arc—that is to say, those ends of the wires coiled around 1, 3, 5, and 7 which enter, as shown in Fig. 3, through the center of the magnet-head, should be electrically connected, and also the like ends of the wires on 2, 4, 6, and 8 as shown in Fig. 8. One group should be electrically connected with one binding-post, T, the other group with the other binding-post, T'.

The construction of the rolling magnets and contact-springs connecting therewith is shown in Fig. 3.

O and O' are steel bearings upon which, as an axis of rotation, the magnet revolves. These are surrounded by hard rubber or other insulating material P and P'.

Q Q and Q' Q' are the cylindrical heads of the magnet.

Through the bearing O in the center of the magnet-head is drilled a hole, through which an insulated wire passes to the coil surrounding the core of the magnet. At its end $b$ it is in contact with the contact-spring F. The other end of the coil of insulated wire encircling the core of the magnet is soldered to the head Q at $a$. The contact-spring F forms part of the connection between magnets 1 and 3 in the manner shown in Fig. 3. At one end, $b$, as has been shown, it connects with the wire coiled about 1. At the other end it is secured by the screw V, and is clamped to an insulated wire, $c$ and $c'$, which encircles V. The part of the wire marked $c$ leads to the contact-spring L, to which it is clamped. The part of the wire marked $c'$ leads to the contact-spring H, which is in like manner clamped by a binding-screw similar to V to the wire coiled around 3.

R, R', and R'' are washers composed of rubber or other insulating material.

U is a rubber sleeve around the screw V.

G is a contact-spring which is in contact at one end, $d$, with the wire coiled around 2, just as F was in contact with the wire of 1. At the other end it is firmly attached to an insulated wire, $e$ and $e'$, which also encircles V, and is insulated from $c$ and $c'$ by the washer R'. The portion of this wire marked $e$ leads to the contact-spring I. The portion marked $e'$ leads to the contact-spring M.

The screws V', V'', and V''' are similar in construction to V. In like manner all the rolling magnets are connected in alternating groups, as has been shown. $k$ and $k'$ and $l$ and $l'$ are the wires through which these connections are made. In the diagram 8, for greater simplicity, $l'$ is not shown.

The method of connection shown in Fig. 2 is that which we have found most convenient in construction. The insulated wire coiled around the first armature, 9, is attached at its inner end to the iron core of that armature and at its outer end to the iron core of the second armature, 10. The inner end of the second armature-coil is likewise attached to its iron core and its outer end to the iron core of the third armature, 11, and so on around the circle till we come to the last one, 24, which has its outer end attached to the iron core of the first armature, and so the circle is completed. The coils on all the armatures are thus connected end to end around the circle, and we have a continuous electric conductor arranged, generally, in the form of a circle. This conductor is insulated for the most part, but is laid bare at equal intervals for the purpose of admitting an electric current to it. For convenience the portions thus uninsulated are attached to the iron core of the armatures, one uninsulated portion to each core.

For the proper working of the machine represented in the drawings, the quantity of current traversing each one of the armature-coils should be the same, and we will now consider how this is accomplished. If the circular conductor were divided into two parts by a diameter, and the electric current admitted at an uninsulated portion at one end of that diameter, and allowed exit by an uninsulated portion at the other end of the diameter, it is evident that the current can take two courses—one on each side of the diameter. It would accordingly divide and take the two courses according to a well-known law, so that if the two sections of the circle are alike, the portion of the current passing through each will be the same—or, in other words, half the current goes one way and half the other way. Now, if instead of two, we have four sections, each section being connected at one end with the positive pole of a battery and at the other end with the negative pole, there will be four equal courses for the current to take, and if we have eight sections, there will be eight equal courses for the current, and so on for any number.

In the machine represented in the drawings the circle of armature-coils is divided into eight sections by the points of contact of the eight magnets. Through four of these contacts the current enters the eight sections, the ends of two sections coming together at each contact, and through the other four it goes out from the eight sections. Thus the current is divided into eight equal parts in the circle of armature-coils, one part passing through each section, and in this particular machine each section is made up of two armature-coils, through which the one-eighth part or subdivision of the current passes in series. There might be any number of armatures in the circle divided into eight sections, provided such number be some multiple of eight. The several sections would in every case be connected in multiple arc—i.e., they furnish so many equal and parallel courses for the current to divide into—but the several members in each section are in series and the one-eighth subdivision of the current traverses each of them in succession. Now, since each contact of a magnet with the armature-circle makes a connection with two sections of armature-coils, one on each side of the magnet, and since each section of armature-coils has a one-eighth subdivision of the current passing through it, it is evident that each magnet has one-fourth of the total current traversing its coil, for the current has to traverse the coil in each magnet before it can reach the point of contact between magnet and armature.

It is a well-known fact that the magnetic potential of an electro-magnet is, within certain limits, proportional to the number of convolutions of wire wrapped around it. It is also proportional to the current traversing the coil.

In order that two electro-magnets should not stick together when like poles are presented to each other, the potentials of the two must be very nearly alike, and should be exactly alike in order to get the full effect of repulsion.

In the machine represented in the drawings we have one-fourth of the total current passing through each magnet, and one-eighth of the total current passing through each armature, and therefore we put finer wire on the armature and have twice as many convolutions on each armature as on each magnet, and this makes the potentials of the two very nearly or exactly alike, and so avoids all back-pull and obtains the force of repulsion. When the current from the battery or other source of power enters the contact-spring of one of the revolving magnets with which the battery is connected, as shown in Fig. 1, one-quarter of it passes through the coil of each of the revolving magnets of that group connected as hereinbefore described. After passing through each magnet-coil and thence to the cylindrical magnet-head, it passes thence to the line of contact between the magnet and the armature-head and there divides again. One branch enters the inner end of the coil of the armature with which it is in contact, and passes through the coil to its outer end, and thence to the inner end of the armature-coil next back from it, (referring to the direction in which the contact moves.) The other branch passes from the armature with which the magnet-head is in contact through the wire connecting it with the outer end of the coil of the armature next in front of it, (referring also to the direction in which the contact moves.) Thus from the head of magnet 1 it passes to armature 9 and there divides, one branch going through the coil 9′ around 9, and the other branch through the coil 24′ to 24. After passing through one group of magnets it passes through the other, and thence to the battery or other source of power, thus completing the circuit. Thus, for example, when the machine is in the position shown in Fig. 8, the current from 1 passes through 9 and there divides. One branch passes through the coil 9′ and thence to 10. This is not in contact with any magnet-head, and the current therefore continues through the coil 10′ and to 11. There it is met by a current in the same direction, which has passed from 3 through 13, 12′, 12, and 11′, and these two branches unite in 11 and pass into the magnet-head 2, which is electrically connected, as has been shown, with 4, 6, and 8. Similar action simultaneously takes place throughout the groups of magnets and armatures.

The magnetic condition resulting from the action thus described is as follows: Considering one end of the machine, alternate magnets are of like polarity, and the intermediate magnets are also of like polarity to each other, but opposite to the first. The circle of armatures is divided by the contacts of the magnets with it into as many sections as there are magnets. Each section is made up of armatures of like polarity to each other, but of opposite polarity to those in the next section. Consequently, each magnet has a repulsive effect on all armatures in the section immediately on one side of it, and an attractive effect on all armatures in the section immediately on the other side of it, and these effects on all the armatures throughout the circle conspire to produce rotation in one direction.

The operation of the machine is as follows: When it is in the position shown in Fig. 2, the cylindrical magnet-head of 1 is of south polarity. The head of armature 9 in contact with it is also of south polarity. That of armature 24 is north. The magnet-head of 1 repels 9 and attracts 24. This brings 24 into contact with the head of 1. The connection between the coil of wire surrounding the core of 24 is now made through the armature-head, instead of through the outer end of the wire. The result is a reversal of the polarity of the armature-head, and it becomes south. At the same time that the polarity of 24 has changed, and for a similar reason, the armature-heads of 10, 12, 14, 16, 18, 20, and 22 have changed their polarity. 12, 16, 20, and 24 have now become south, and 10, 14, 18, and 22 have become north. Each therefore ceases to be attracted by the magnet with which it has come in contact, and is repelled by it. Each comes at the same time within the magnetic field of the magnet next in advance, and is attracted by it, while it is repelled by the magnet-head just back of it. Each armature has thus been attracted by one magnet while repelled by another, thus producing a continuous rotary motion of the wheels C and C', to which the armatures are attached, and of the axis E.

The polarity of each magnet-head and armature at the instant shown in the position of Figs. 1 and 2, and also in the position shown in Fig. 8, is indicated by the letters N for "north" and S for "south," respectively. Of course the polarity of the head of each magnet and armature at the end shown in Fig. 1 is the opposite to that of the head of the same at the end shown in Fig. 2.

The machine might be so constructed that the magnets should be attached to a revolving wheel and the armatures remain without advance or retrogression, and permanent magnets might be substituted for the rolling electro-magnets 1 to 8, (shown in the drawings;) but for practical purposes we think the arrangement of parts shown in the drawings preferable.

The coils of the electro-magnetic armatures attached to the drums are so adjusted and connected that as long as the head of any one armature is in contact with the head of any one of the magnets 1 to 8 the current through the coil around the armature moves in the same direction as the current through the coils of the electro-magnet with which it is in contact. The effect of this is to make the armature-head which is in contact with the head of the electro-magnet and the head of the electro-magnet itself of like polarity. The coils of these electro-magnetic armatures are likewise so adjusted and connected that the current through that end of the armature-coil which is not in contact with the head of its own armature passes to and around the armature next in succession in a direction the reverse of that in which the current passes round the armature next in advance. The result of this may be thus stated: Those two armatures which are next in succession to the armature in contact with a magnet-head are of a polarity the opposite of such magnet-head, and are therefore attracted by it. The armature which is next in advance of the same armature in contact with the same magnet-head and the armature which is thus in contact are of the same polarity as such magnet-head, and are therefore repelled by it. Immediately after the contact between an armature-head and the electro-magnet head is broken the succeeding armature-head comes in contact with the magnet-head. This armature-head consequently receives the current from the magnet-head with which it has thus come in contact, and not from the armature-head which has just ceased to be in contact with the magnet-head. The polarity of the incoming armature-head is therefore reversed, becoming the same as that of the magnet-head with which it has thus come in contact. The armature next in succession retains the same polarity as before, because no change takes place in the direction of the current around it. It therefore still continues to be attracted by the head of the electro-magnet until, as both armatures continue their advance, the contact between the one armature-head and the magnet-head ceases, and that between the incoming armature-head and the magnet head is established, when at once the direction of the current round the incoming armature-head is reversed, and a series of phenomena similar to those just before described is again produced.

In the machine shown in the drawings the group of armatures is attached to the shaft, and the field magnets are adjusted so as to come in contact with the exterior surfaces of these armatures. The group of electro-magnets might be attached to the shaft and revolve inside the drums to which the group of armatures is attached, in that case making contact with the interior surfaces of the armatures. In that construction of machine the armatures might be stationary.

What we claim as new, and desire to secure by Letters Patent, is as follows:

1. The combination, first, of two or more electro-magnetic armatures the coil around each of which is connected at one end with the core of its own armature and at the other end with the core of the next armature, thus forming a continuous conductor, with, second, two or more magnets, one head at least of each of which has a curved peripheral surface, each magnet turning on its own axis of rotation and coming in contact as it turns with the successive heads of the electro-magnetic armatures.

2. An electro-magnetic machine consisting, first, of two or more electro-magnetic armatures the cores of which are insulated from each other both magnetically and electrically, except through the coils around each; second, of two or more magnets arranged to come in successive contact with such electro-magnetic armatures; and, third, of the coils of said armatures, the electric circuit of each coil being completed through the heads of its cores and through the magnets and the directions of the currents in which circuits are reversed by the shifting of the successive contacts between the armatures and magnets, substantially as described.

3. A drum of non-magnetic material with electro-magnets attached thereto the cores of which are insulated from each other both magnetically and electrically, except through the coils thereof, and the coil around each of which is connected at one end to the core of its own electro-magnet and at the other end to the core of the next electro-magnet, substantially as described.

4. A cylindrical drum the periphery of which is composed of several pieces of soft iron separated from each other by non-magnetic material, and wrapped with conducting-coils of wire, in combination with one or more magnets having curved peripheral surfaces adapted to roll on the periphery of said drum and come successively into contact with each of the iron strips, and a commutating device by which the electric current in the coil around each of said pieces of iron is reversed every time that piece of iron reaches a magnet.

5. The combination of a series of electro-magnets connected electrically in alternating groups, so that the current shall enter and pass through all of one group, and from that group through all the other group, and thence back to its source, with a series of electro-magnetic armatures connected substantially as described, and forming part of the same circuit, so that each armature-head shall be at the same time attracted by one magnet-head and repelled by another, and so, also, that each armature-head shall be alternately attracted and repelled by one magnet-head.

Signed by us this 22d day of November, A. D. 1883.

CHARLES C. PECK.
WM. H. CHAPMAN.

Witnesses as to the signature of Charles C. Peck:
B. F. CHURCHILL,
GEO. M. FLETCHER.

Witnesses as to the signature of William H. Chapman:
HENRY C. FREEMAN,
HAROLD G. CORTIS.